United States Patent
Kalhan et al.

(10) Patent No.: US 10,477,570 B2
(45) Date of Patent: Nov. 12, 2019

(54) ADVANCE COMMUNICATION RESOURCE NOTIFICATION IN WIRELESS COMMUNICATION SYSTEMS HAVING OVERLAPPING SERVICE AREAS

(71) Applicant: Kyocera Corporation, Kyoto (JP)

(72) Inventors: Amit Kalhan, San Diego, CA (US);
Henry Chang, San Diego, CA (US);
David Comstock, San Diego, CA (US);
Douglas Dunn, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 805 days.

(21) Appl. No.: 14/433,288

(22) PCT Filed: Oct. 8, 2013

(86) PCT No.: PCT/US2013/063879
§ 371 (c)(1),
(2) Date: Apr. 2, 2015

(87) PCT Pub. No.: WO2014/058878
PCT Pub. Date: Apr. 17, 2014

(65) Prior Publication Data
US 2015/0282206 A1    Oct. 1, 2015

Related U.S. Application Data

(60) Provisional application No. 61/710,978, filed on Oct. 8, 2012.

(51) Int. Cl.
*H04W 72/12* (2009.01)
*H04L 5/00* (2006.01)
*H04W 72/04* (2009.01)

(52) U.S. Cl.
CPC ....... *H04W 72/1278* (2013.01); *H04L 5/0005* (2013.01); *H04W 72/0446* (2013.01); *H04W 72/0453* (2013.01)

(58) Field of Classification Search
CPC ............ H04L 5/0005; H04W 72/0446; H04W 72/0453
See application file for complete search history.

(56) References Cited

U.S. PATENT DOCUMENTS

2007/0211757 A1* 9/2007 Oyman .................. H04L 5/023
370/468
2008/0107063 A1* 5/2008 Oleszczuk ............ H04W 16/10
370/315
(Continued)

FOREIGN PATENT DOCUMENTS

JP    2011-514719    5/2011
JP    2011-124857    6/2011
(Continued)

OTHER PUBLICATIONS

NTT Docomo, "Downlink Interference Coordinating Between eNodeB and Home eNodeB," R4-093203, TSG-Ran Working Group 4 Meeting #52, Shenzhen, CN, Aug. 24-28, 2009.
(Continued)

*Primary Examiner* — Jael M Ulysse

(57) ABSTRACT

In a communication system that includes at least a first base station having a first geographical service area and second base station having a second geographical service area that overlaps at least partially with the first geographical service area, a relaying mobile wireless communication device receiving service from the second base station receives and forwards scheduling information to the second base station, where the scheduling information is transmitted by the first base station and identifies communication resources that will be used for wireless communication by the first base station. Based at least on the scheduling information, the second base station schedules communication resources to mobile
(Continued)

wireless communication devices receiving service from the second base station such that interference is reduced, minimized, or eliminated.

27 Claims, 12 Drawing Sheets

(56) References Cited

U.S. PATENT DOCUMENTS

| | | | | |
|---|---|---|---|---|
| 2010/0029282 A1* | 2/2010 | Stamoulis | ............. | H04W 16/10 |
| | | | | 455/436 |
| 2010/0238845 A1* | 9/2010 | Love | ................ | H04B 7/15528 |
| | | | | 370/280 |
| 2010/0322180 A1* | 12/2010 | Kim | ................ | H04W 72/1289 |
| | | | | 370/329 |
| 2011/0053604 A1* | 3/2011 | Kim | ..................... | H04W 16/16 |
| | | | | 455/450 |
| 2011/0170496 A1* | 7/2011 | Fong | .................... | H04L 5/0053 |
| | | | | 370/329 |
| 2011/0194527 A1* | 8/2011 | Lin | ........................ | H04B 7/022 |
| | | | | 370/330 |
| 2011/0275382 A1* | 11/2011 | Hakola | ................ | H04W 24/10 |
| | | | | 455/452.2 |
| 2011/0319025 A1* | 12/2011 | Siomina | ................. | H04B 7/024 |
| | | | | 455/63.1 |
| 2012/0034924 A1* | 2/2012 | Kalhan | ............... | H04W 72/042 |
| | | | | 455/444 |
| 2012/0087250 A1* | 4/2012 | Song | .................... | H04W 24/02 |
| | | | | 370/242 |
| 2012/0113812 A1* | 5/2012 | Ji | ...................... | H04W 72/1263 |
| | | | | 370/241 |
| 2012/0157108 A1* | 6/2012 | Boudreau | ............. | H04W 16/32 |
| | | | | 455/450 |
| 2012/0176955 A1* | 7/2012 | Ishii | ..................... | H04W 72/042 |
| | | | | 370/315 |
| 2012/0190378 A1* | 7/2012 | Han | ..................... | H04B 7/0639 |
| | | | | 455/452.2 |
| 2012/0207025 A1* | 8/2012 | Barbieri | .................... | H04L 1/20 |
| | | | | 370/236 |
| 2012/0236800 A1* | 9/2012 | Park | .................. | H04W 72/1226 |
| | | | | 370/329 |
| 2012/0243488 A1* | 9/2012 | Gupta | ............... | H04W 72/0426 |
| | | | | 370/329 |
| 2013/0083780 A1* | 4/2013 | Luo | ................... | H04W 72/0406 |
| | | | | 370/336 |
| 2013/0288695 A1* | 10/2013 | Okino | .................. | H04W 16/08 |
| | | | | 455/450 |
| 2014/0133387 A1* | 5/2014 | Wagner | ............. | H04W 72/1289 |
| | | | | 370/315 |

FOREIGN PATENT DOCUMENTS

| | | |
|---|---|---|
| WO | WO2009-151296 | 12/2009 |
| WO | WO2010-120015 | 10/2010 |

OTHER PUBLICATIONS

Motorola "HeNB Interference Coordination," R1-094839 3GPP TSG-RAN WG1 Meeting #59, Jeju, South Korea, Nov. 8-14, 2009.

* cited by examiner

ADVANCE COMMUNICATION RESOURCE NOTIFICATION IN WIRELESS COMMUNICATION SYSTEMS HAVING OVERLAPPING SERVICE AREAS

RELATED APPLICATIONS

The application claims the benefit of priority of U.S. Provisional Patent Application Ser. No. 61/710,978, entitled "METHOD TO AVOID INTERFERENCE IN TWO-TIERED NETWORK USING ADVANCE SCHEDULING INFORMATION", filed on Oct. 8, 2012, and incorporated by reference in its entirety, herein.

BACKGROUND

The invention relates in general to wireless communication systems and more specifically to management of communication resources in wireless communication systems having overlapping service areas.

Base stations in cellular communication systems provide communications services to wireless communication devices within geographical cells where each base station exchanges signals with wireless communication devices within an associated cell. The size and shape of each cell and, therefore, the coverage area of the base station are determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. The proximity of the various base stations and wireless communication devices operating on the same frequency channel often results in interference. Interference can occur within the uplink channel as shown in FIG. 1A or in the downlink channel as shown in FIG. 1B. In FIG. 1A and FIG. 1B, a large service area (LSA) communication node (base station) 10 provides wireless service within an LSA 12 and a small service area (SSA) communication node (base station) 14 provides wireless service within an SSA 16. The SSA 16 and the LSA 12 at least partially overlap. In FIG. 1A and FIG. 1B, the SSA 16 is within the LSA 12. The communication nodes 10, 14 provide wireless service to mobile wireless communication devices 18, 20, sometimes referred to user equipment (UE) within their respective service areas. A SSA UE (SUE) 18 receives service from the SSA communication node 14 and an LSA UE (LUE) 20 receives service from the LSA communication node 10. As shown in FIG. 1A, the LUE 20 transmits uplink signals 22 to the LSA communication node 10 and the SUE transmits uplink signals 24 to the SSA communication node 14. When the LUE 20 and the SUE 18 use the same frequency for transmitting uplink signals 22, 24 at the same time, the LSA uplink signal 22 causes interference at the SSA communication node 14 by interfering with the SSA uplink signal 24. In addition, interference can also occur at the LSA communication node 10 due to the uplink signal 24 transmitted by the SUE 18. As shown in FIG. 1B, the LSA communication node transmits downlink signals 26 to the LUE 20 and the SSA communication node transmits downlink signals 28 to the SUE 18. When the LSA and SSA communication nodes use the same frequency for transmitting downlink signals at the same time, the SSA downlink signal causes interference at the LUE by interfering with the LSA downlink signal. Interference may also result from the LSA downlink signal 26 at the SUE. Interference is particularly significant if the LUE 20 is operating near the SSA communication node 14 due to the strong uplink and downlink signals and there is no coordination between the LSA communication node 10 and the SSA communication node 14.

SUMMARY

In a communication system that includes at least a first base station having a first geographical service area and second base station having a second geographical service area that overlaps at least partially with the first geographical service area, a relaying mobile wireless communication device receiving service from the second base station receives and forwards resource information to the second base station, where the resource information is based on scheduling information transmitted by the first base station and identifies communication resources that will be used for wireless communication with the first base station. Based at least on the resource information, the second base station schedules communication resources to mobile wireless communication devices receiving service from the second base station such that intra-frequency interference is at least reduced and, in some circumstances, minimized or eliminated.

DETAILED DESCRIPTION

The communication resource management techniques discussed herein can be applied within communication systems that include at least two base stations having at least partially overlapping geographical service areas. For the examples discussed below, the communication system includes a large service area (LSA) base station having a LSA geographical service area and a small service area (SSA) base station having a SSA geographical service area that is smaller than the LSA geographical service area. The LSA base station provides wireless communication service to mobile wireless communication devices referred to as LSA UEs (LUEs) within the LSA geographical service area. The SSA base station provides wireless communication service to mobile wireless communication devices referred to as SSA UEs (SUEs) within the SSA geographical service area. The LSA base station transmits LSA scheduling information identifying communication resources that will be used for communication with the LSA base station. A relaying SUE (RSUE) receives the LSA scheduling information and forwards information indicative of the LSA scheduling information to the SSA base station. Based on the information, the SSA base station schedules communication resources to the SUEs.

Figure 1A:
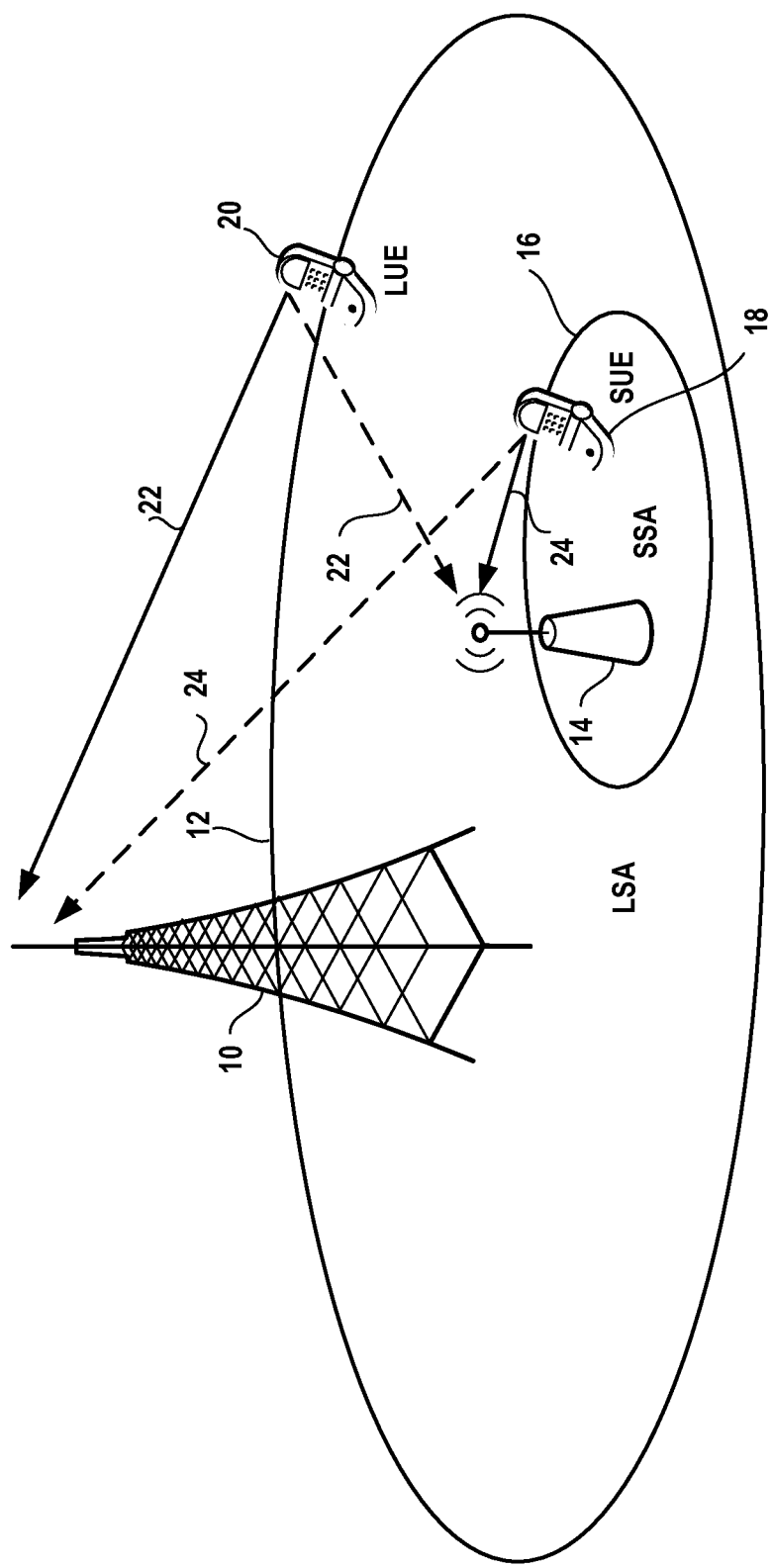
FIG. 1A is an illustration of a communication system having a small service area (SSA) within a large service area (LSA) where interference occurs at the SSA base station providing service in the SSA and at the LSA base station providing service in the LSA.
Figure 1B:
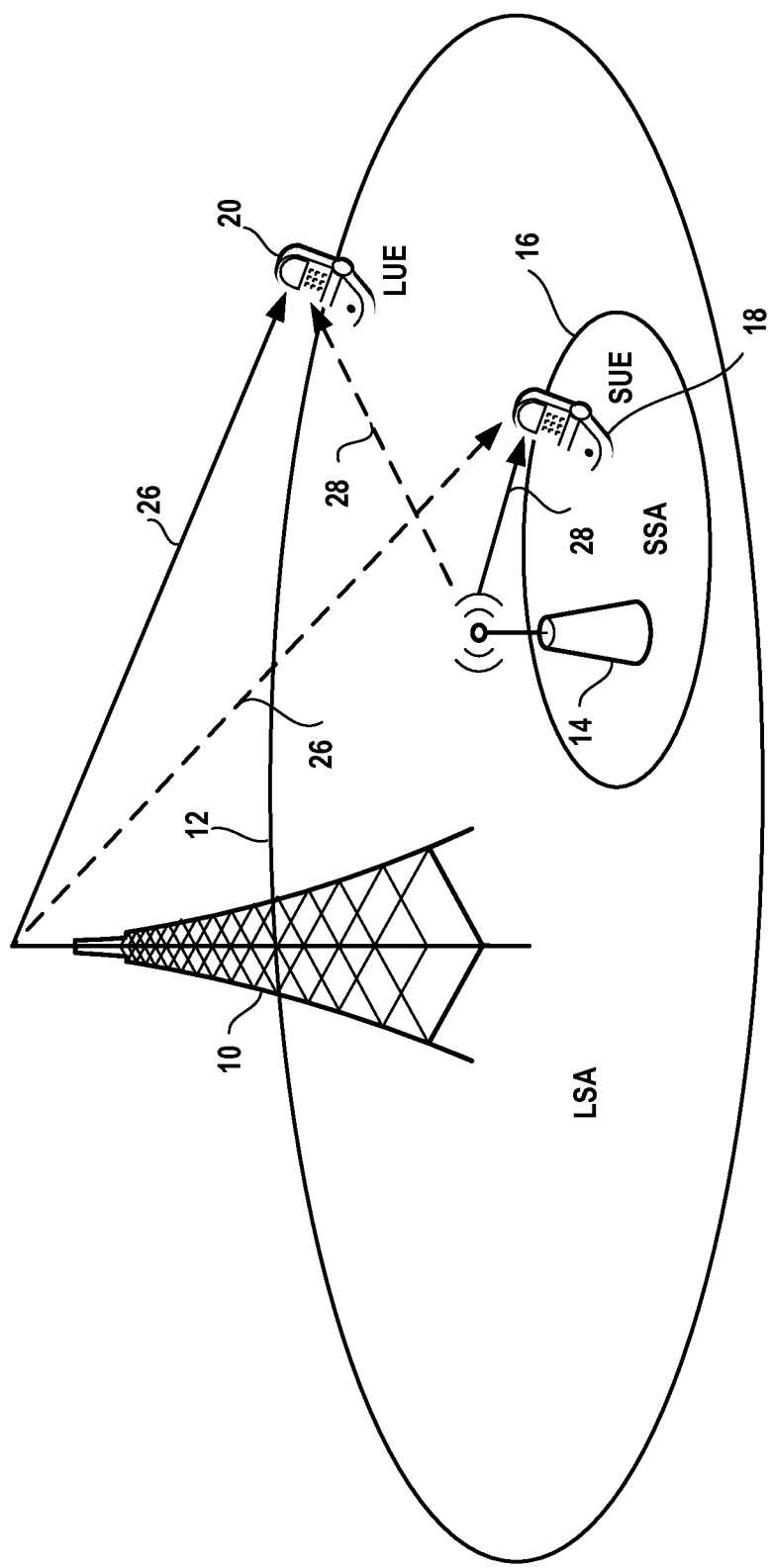
FIG. 1B is an illustration of the communication system having a small service area (SSA) within a large service area (LSA) where interference occurs at a wireless communication device in the LSA and at a wireless communication device within the SSA.
Figure 2:
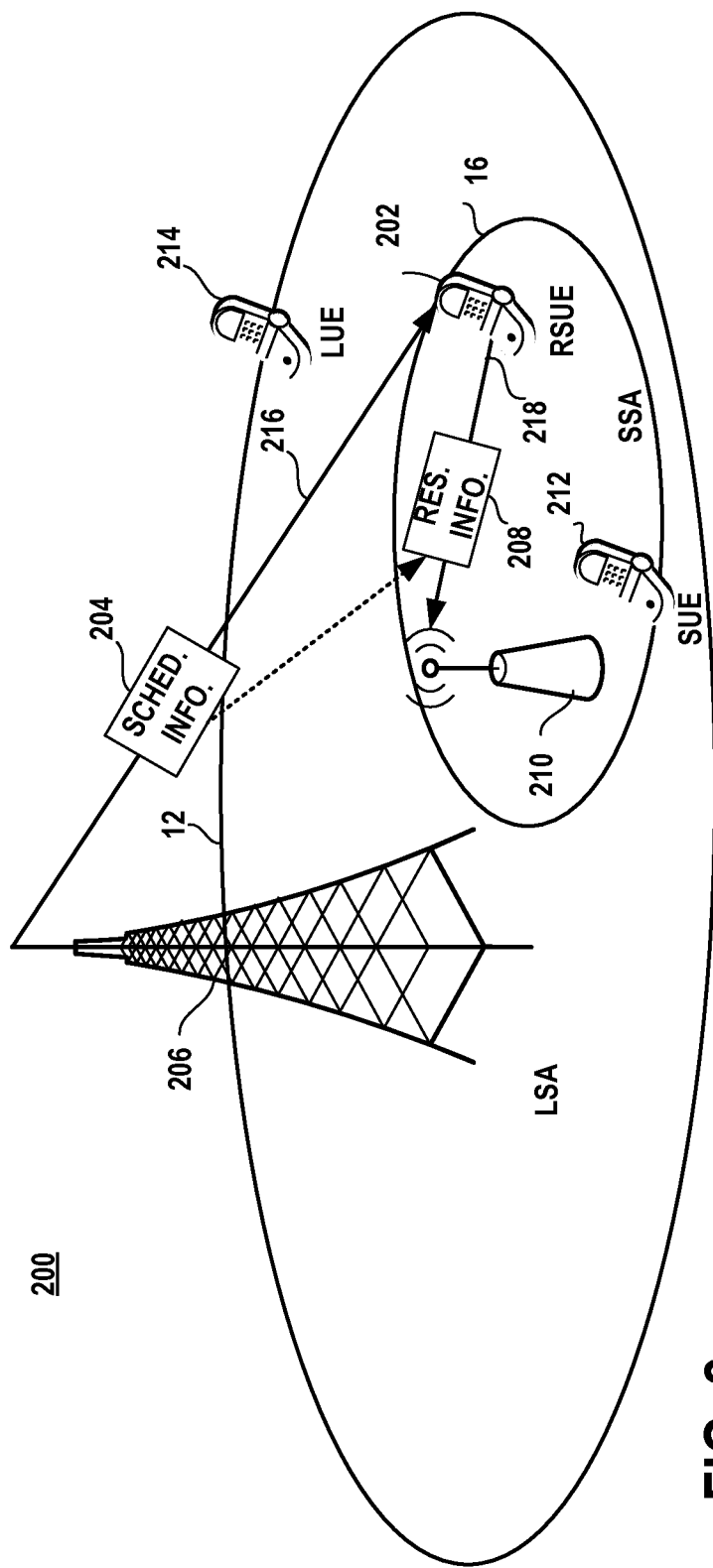
FIG. 2 is an illustration of a communication system where a mobile wireless communication device (RSUE) receives LSA scheduling information from a first base station (LSA base station) and transmits resource information to a second base station (SSA base station) where the resource information conveys the LSA resource information.

FIG. 2 is an illustration of a communication system 200 where a mobile wireless communication device (RSUE) 202 receives LSA scheduling information 204 from a first base station (LSA base station 206) and transmits resource information 208 to a second base station (SSA base station) 210 where the resource information 208 conveys the LSA resource information 204. In some cases the resource information 208 is identical to the LSA scheduling information 204 and the RSUE 202 forwards the LSA scheduling information 204 to the second base station (SSA base station) 210. The scheduling information 204 identifies the communication resources that will be used by the LSA base station 206 where the communication resources may include uplink communication resources, downlink communication resources, or both. Based on the scheduling information 204, the SSA base station 210 schedules communication resources to wireless communication devices (SUEs) 202, 212 receiving wireless service from the SSA base station 210. The SSA base station 210 uses the resource information 208 (LSA scheduling information 204) to assign uplink and/or downlink resources to reduce interference where the interference may include interference on the uplink at the second base station 210, interference on the downlink at a wireless communication device (LUE) 214 receiving service form the first base station (LSA base station) 206, interference on the uplink at the first base station 206 and/or interference at a wireless communication device (SUE) 212.

The communication system 200 may be implemented in accordance with any of numerous technologies and communication standards. For the examples discussed below, however, the system 200 operates in accordance with an orthogonal frequency division multiplex (OFDM) standard. In an OFDM based system, a physical channel can be defined by allocating specific frequency-time resources. The granularity of these resources depends on the specification and design of the system. Particular implementations may further specify frequency, timing, and coding parameters for each base station and/or wireless communication device. Examples of systems that include multiple sized and overlapping service areas includes systems that operate in accordance with 3GPP Long Term Evolution (LTE) communication specification communication specification and include one or more of macrocells, microcells, picocells and femtocells. In such systems, the base stations are typically referred to as eNodeBs. A larger service area (LSA) eNodeB, such a macro eNodeB has a larger service area 12 than a smaller service area (SSA) eNodeB such as a Micro eNodeB, Pico eNodeB, or Femto eNodeB. As discussed herein, a larger service area (LSA) base station 206 is any type of base station, eNodeB, or transceiver station that provides communication services within a larger service area 12 than a smaller service area (SSA) base station 210 where the SSA base station is any type of base station, eNodeB, or transceiver station providing service within the smaller geographical service area 16.

The base stations 206, 210 include wireless transceivers that exchange wireless signals with the wireless communication devices (UEs) 202, 212, 214. Transmissions from the base stations and from the wireless communication devices (UEs) are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device. The control channel may include a logical broadcast control channel as well as device-specific logical control channels (not shown in FIG. 2).

The various functions and operations of the blocks described with reference to the communication system 200 may be implemented in any number of devices, circuits, and/or elements as well as with various forms of executable code such as software and firmware. Two or more of the functional blocks in the figures may be integrated in a single device and the functions described as performed in any single device may be implemented over several devices.

The system 200 includes at least the large service area (LSA) base station 206, the small service area (SSA) base station 210 and two wireless communication devices 202, 214. In some situations, the system 200 may include other wireless communication devices 212. For example, the wireless communication device (RSUE) 202 that forwards the scheduling information may be different from the wireless communication device (SUE) 212 that is being assigned communication resources to communicate with the SSA base station 210. In most circumstances, several LSA base stations are connected to a network controller (not shown) through network infrastructure to provide wireless communication services to multiple wireless communication devices. Typically the SSA base station 210 is not connected to the same controller and does not communicate with the LSA base station 206. The techniques discussed herein, however, may also be advantageous where the SSA base station 210 is connected to the LSA base station 206 and/or the LSA network but the communication link to the SSA base station has latency greater than 1 millisecond.

The mobile wireless communication devices 202, 212, 214 may be referred to as mobile devices, wireless devices, wireless communication devices, mobile wireless devices, user equipment (UE), UE devices, as well as by other terms. The wireless communication devices 202, 212, 214 include electronics and code for communicating with the base stations and include devices such as cell phones, personal digital assistants (PDAs), wireless modem cards, wireless modems, and laptop computers as well as other devices. For the examples discussed herein, the wireless communication devices receiving wireless service within the LSA from the LSA bases station are referred to as LSA UEs (LUEs) 214 and the wireless communication devices receiving service from the SSA base station within the SSA are referred to as SSA UEs (SUEs) 202, 212. The wireless communication device 202 that forwards the LSA scheduling information 204 to the SSA base station is referred to as the relaying SUE (RSUE) 202.

The RSUE 202 receives the LSA scheduling information 204 from the LSA base station 206 in an LSA downlink signal 216. Various techniques may be used to transmit the LSA scheduling information 204 to the RSUE 202. Two examples include broadcasting the LSA scheduling information 204 in a system information block (SIB) message and broadcasting the scheduling information 204 in a multicast-broadcast single-frequency network (MBSFN) subframe.

The RSUE 202 transmits the LSA scheduling information or resource information 208 indicative of the LSA scheduling information 204 to the SSA base station 210 over an uplink signal 218. For the examples herein, the RSUE requests uplink resources for transmission of the resource information 208 and the SSA base station assigns Physical Uplink Shared Channel (PUSCH) resources for transmission of the information. Also, for the example, the request for resources includes an indication that the request is for LSA resource information. In this way, the SSA base station may selectively deny requests where, for example, the LSA resource information has already been received from another RSUE. In some implementations, the RSUE may only provide an indication that LSA resource information is available and the SSA base station assigns uplink resources for transmission of the information and instructs the RSUE to transmit the information if desired. Other techniques for managing the transmission of the LSA resource information may be used in some circumstances.

The LSA scheduling information 204 is any data or information that identifies the communication resources, such as time-frequency resources, that will be used for LSA communication. In the examples, only LSA resources used by LUEs that may cause interference or that may experience interference are identified by the LSA scheduling information 204. For example, if an LUE uplink transmission from a particular LUE is anticipated to cause interference at an SSA base station, the uplink LSA communication resources scheduled to that LUE are reported in the LSA scheduling information. Similarly, if a downlink transmission from an SSA base station is likely to cause interface at a LUE, the downlink resources are identified in the LSA scheduling information. For the example described herein and as discussed below in further detail, the interference is anticipated based on reported signal measurements such as RSRP (Reference Signal Received Power) and RSRQ (Reference Signal Received Quality) provided by the UEs in accordance with conventional reporting techniques. Transmission of measurement reports are based on an event trigger optimized of interference detection although other techniques may be used to trigger the transmission of a measurement report that is used to evaluate the potential for interference. In some circumstances, the potential for interference may be evaluated based on other information either independently or in conjunction with measurement reports. As discussed below, for example, an excessive number of Hybrid Automatic Repeat Request (HARQ) retransmissions, Radio Link Failures, or Handover failures may be used to determine that interference is occurring and is may continue.

The SSA base station 210 uses the resource information 208 based on the LSA scheduling information 208 to schedule (assign) communication resources to SUEs to minimize interference. As discussed, the potential interference may be at a LUE 214, the SUE 202, 212, LSA base station 206, and/or may be at the SSA base station 210. In some situations, the SSA base station 210 may not assign a communication resource identified in the LSA scheduling information 204 to any SUE. In other situations, however, the SSA base station 210 may assign an identified communication resource to a SUE that is likely to tolerate the interference or is not likely to cause interference. For example, if the LSA scheduling information 204 identifies a time-frequency resource that will be used for LSA uplink communication, the SSA base station 210 may assign the same time-frequency resource to a SUE that requires a low quality of service (QoS) or that is determined to be very near the SSA base station 210. Further, if the LSA scheduling information 204 identifies a time-frequency resource that will be used for LSA downlink communication, the SSA base station 210 may assign the identified time-frequency resource to a SUE that is determined to be very near the SSA base station 210 and transmitting at a low power level. The SSA base station, therefore, may schedule identified LSA communication resources based on several factors.

Figure 3A:
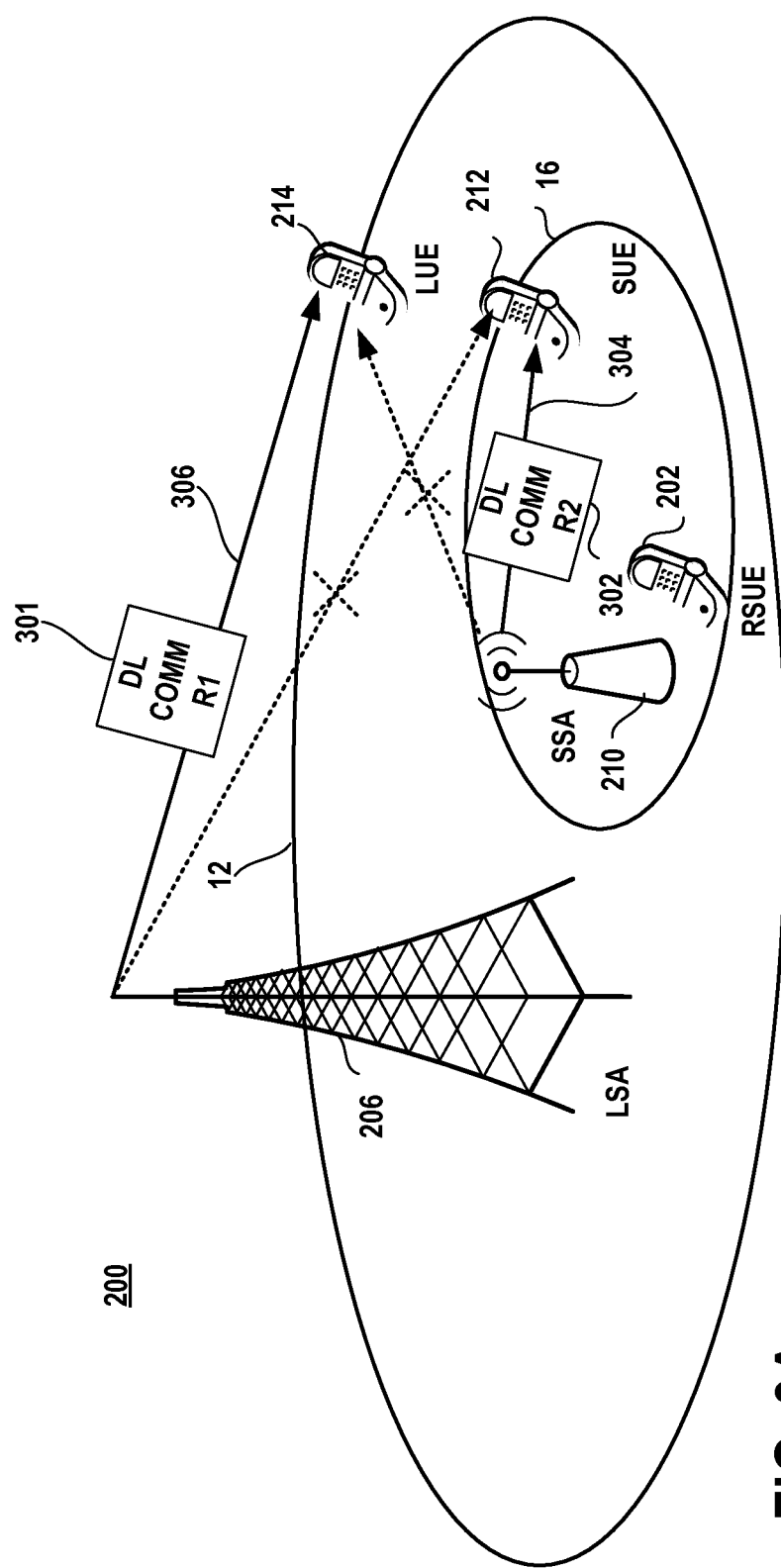
FIG. 3A is an illustration of the communication system where the interference at a LUE and/or a SUE is at least reduced by scheduling downlink communication resources to SUEs based on the LSA scheduling information.
Figure 3B:
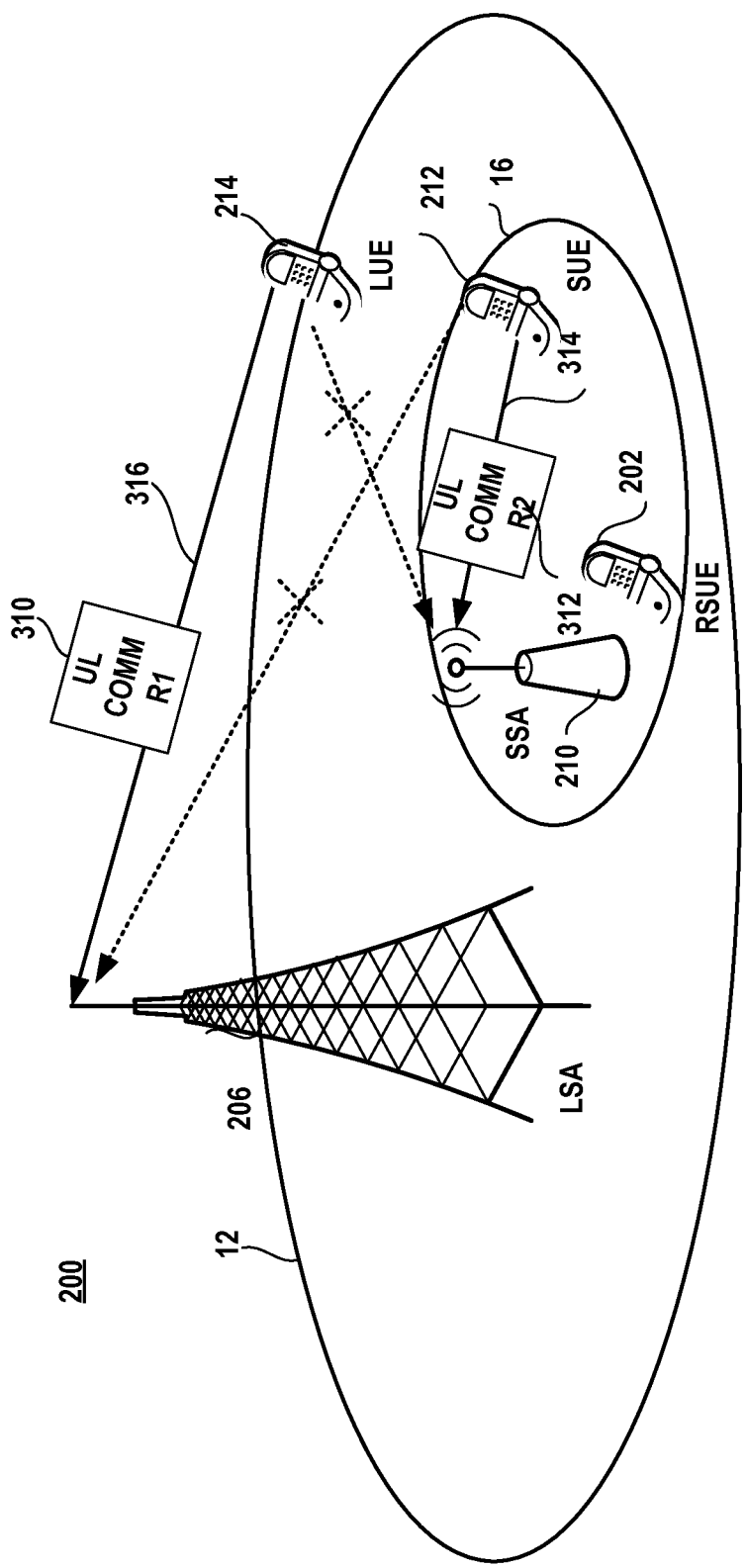
FIG. 3B is an illustration of the communication system where the interference at a SSA base station and/or a LSA base station is at least reduced by scheduling uplink communication resources to SUEs based on the LSA scheduling information.

FIG. 3A and FIG. 3B are illustrations of the communication system 200 showing the reduction in interference when the SSA bases station 210 schedules communication resources to SUEs 202, 212 using the LSA scheduling information 204 (or resource information 208).

FIG. 3A and FIG. 3B are depictions of exemplary geographical service area relationship provided by the first base station 206 and the second base station 210. The first base station 206 is capable of providing wireless service to wireless communication devices within a first base station geographic service area 12 and the second base station 210 is capable of providing wireless service to wireless communication devices within a second station geographical service area 16. Accordingly, a geographic service area is the coverage area of the base station. The second base station geographical service area 16 and the first base station geographic service area 12 may have any of numerous shapes, sizes, and configurations. The ovals representing the service areas generally illustrate the general relationships between the service areas and do not necessarily depict the actual shapes or sizes of the service areas to scale. Further, the service areas may contain holes of coverage where service is unavailable. In the interest of clarity and brevity, such features are not illustrated in the figures. In FIG. 3A and FIG. 3B, the service area 16 of the second base station 210 is completely within the service area 12 provided by the first base station 206. Such a service area relationship often occur where some base stations within the communication system provide smaller service regions such as microcell, picocell, and femtocell configurations. A femtocell arrangement, for example, may include a femtocell base station (second base station 210) located at a residence where the femtocell is a service area for devices used by device users living at the residence. When the wireless communication devices are outside the service area 12, service is provided by larger macrocells (e.g. first base station 206).

FIG. 3A is an illustration of the communication system 200 where the interference at a LUE is at least reduced or minimized by scheduling downlink communication resources to SUEs based on the LSA scheduling information. For the example of FIG. 3A, the LSA base station 206 determines the potential for interference at the LUE 214 based on measurement reports provided by the LUE 214. As a result, LSA scheduling information 204 is transmitted by the LSA base station 206 and conveyed to the SSA base station 210 by the RSUE, where the LSA scheduling information 204 identifies a first downlink communication resource (R1) 301 that will be used for transmission to the LUE 210. Based on the information, the SSA base station does not schedule the first downlink communication resource (R1) 301 for communication with the SUE 212 or RSUE 202, Instead, the SSA base station schedules a second downlink communication resource (R2) 302. As a result, the SSA downlink transmission 304 does not interfere with the LSA downlink transmission 306 received at the LUE 214. As discussed above, the SSA base station 210 may assign the first downlink communication resource (R1) 301 to another SUE (not shown) where it is determined that the SSA downlink communication is not likely to cause interference to LUE 214 or where the interference can be tolerated by the particular SUE.

FIG. 3B is an illustration of the communication system 200 where the interference at a SSA base station 210 is at least reduced by scheduling uplink communication resources to SUEs based on the LSA scheduling information 204. For the example of FIG. 3B, the LSA base station 206 determines the potential for interference at the SSA 210 based on measurement reports provided by the LUE 214. If the LUE measurement reports indicate a sufficiently high power level of a downlink signals transmitted by the SSA base station, the LSA base station determines that the LUE uplink signal will at least potentially interfere with an uplink signal transmitted from a SUE. LSA scheduling information 204 is transmitted by the LSA base station 206 and conveyed to the SSA base station 210 by the RSUE 202, where the LSA scheduling information 208 identifies a first uplink communication resource (R1) 310 that will be used for transmission by the LUE 210. Based on the information, the SSA base station 210 does not schedule the first uplink communication resource (R1) 310 for communication to either the SUE 212 or the RSUE 202. Instead, the SSA base station 210 schedules a second uplink communication resource (R2) 312. As a result, the LUE's 210 uplink transmission 312 does not interfere with the SUE's uplink transmission 314 received at the SSA base station 210. As discussed above, the SSA base station 210 may assign the first uplink communication resource (R1) 310 to another SUE (not shown) where it is determined that the LUE transmission is not likely to interfere with the SUE uplink transmission. This may occur, for example, where the SUE is very close to the SSA base station.

Figure 4:
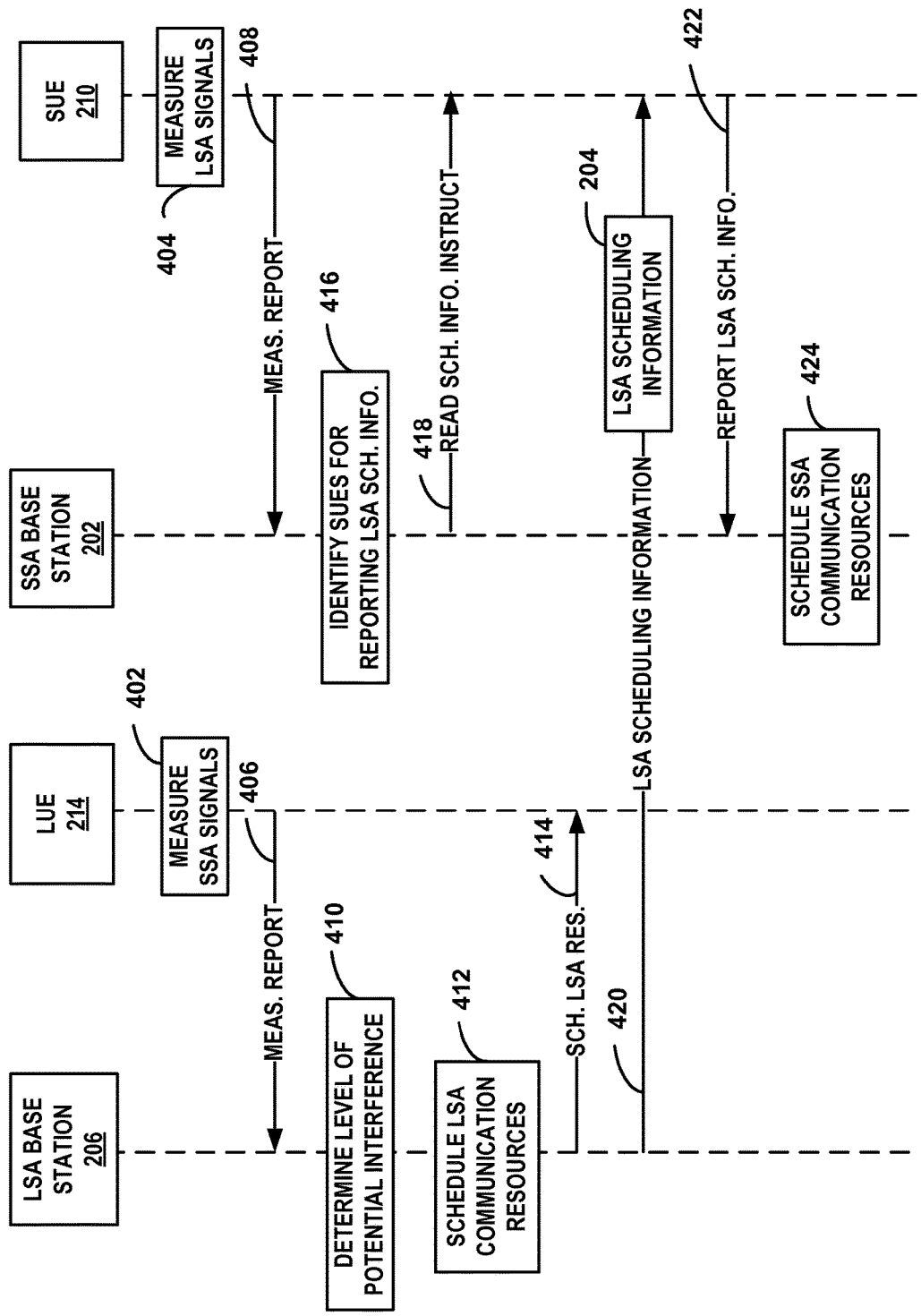
FIG. 4 is a message diagram illustrating at least some of the communication related to managing interference within the communication system.

FIG. 4 is a message diagram illustrating at least some of the communication related to managing interference within the communication system 200.

At event 402, the LUE measures the reference signals transmitted by neighboring cells including the SSA. For the example, the LUE measures the RSRP (Reference Signal Received Power) and/or the RSRQ (Reference Signal Received Quality) in accordance with known techniques of Radio Resource Management (RRM) for identifying handover candidate cells.

At event 404, the SUE measures the reference signals transmitted by the LSA base station. For the example, the SUE measures the RSRP and/or RSPQ in accordance with known techniques.

At transmission 406, the LUE reports the SSA reference signal measurements to the LSA base station. Although conventional triggers for transmitting measurement reports may be used in some circumstances, modifications to the reporting scheme may improve efficiency and robustness. As is known, conventional event triggers in LTE are managed by the network and include Event A1 (Serving becomes better than threshold), Event A2 (Serving becomes worse than threshold), Event A3 (Neighbor becomes offset better than PCell), Event A4 (Neighbor becomes better than threshold), Event A5 (PCell becomes worse than threshold) and neighbor becomes better than threshold2), and Event A6 (Neighbor becomes offset better than SCell). Conventional triggers for invoking transmission of measurement reports are typically established for managing handovers. Although there exist conventional methods for the LSA base station to configure the LUE to perform periodical reports, they are not typically used except for the Self-Optimized Networks (SON) or when new base stations are installed. Accordingly, the thresholds involved with these reporting procedures may be different than the optimal thresholds for identifying interference. For the example described herein, an Event A7 is used to trigger transmission of measurement reports for managing interference. The threshold of the Event A7 trigger is selected to optimize identification and management of interference. In some implementations, the event trigger for transmitting a measurement report may be a conventional event trigger. In these situations, the threshold of the trigger may be modified to improve identification of interference. Where conventional event triggers are used however, a LUE sending a measurement report is also likely to be a candidate for a handover to the SSA base station. If the LUE is transferred to the SSA, the potential for interference is averted. As a result, the procedure described with reference to FIG. 4 continues only if the LUE does not perform a handover procedure to the SSA base station.

At transmission 408, the SUE reports the LSA reference signal measurements to the SSA base station. The measurement reports are transmitted in the uplink channel from the UEs in accordance with known techniques. Although conventional event triggers may be used to trigger the transmission of the measurement reports, an event A7 trigger is used by the SUEs to trigger measurement reports for interference management. The threshold for event A7 trigger is selected such that the report is transmitted when the quality of the signals received from the LSA base station at the SUE is sufficient to enable the SUE to receive and decode the scheduling information, when available.

At event 410, the LSA base station determines the potential for interference. For the example, the LSA base station evaluates the measurement reports provided by the LUE to determine a level of potential interference. The LSA base station determines the pathloss from the SSA base station to the LUE based on the transmission power of the reference signal and the reported measurements. Applying the pathloss information to the known transmission power level of an uplink signal transmitted from the LUE allows the LSA base station to determine at least an approximate power level at the SSA base station of the uplink signal transmitted by the LUE. As a result, the LSA base station can determine the likelihood of the uplink signal causing interference at the SSA base station. Based on the pathloss information and the power level of downlink signals, the LSA base station 206 can determine at least an approximate power level at the LUE 214 of an SSA downlink signal transmitted from the SSA base station 210. A level of interference at the LUE due to SSA downlink signals is determined (or at least approximated) from the SSA downlink signal power level at the LUE and the power level of the received LSA downlink signals at the LUE. Therefore, the LSA base station can determine a level of anticipated interference at the SSA base station and/or at the LUE. More than one LUE may be identified as potentially causing or experiencing interference. As a result, the LSA scheduling information identifies all communication resources assigned to all LUEs that may experience or cause interference.

In some circumstances, the LSA base station may identify a potential for interference without measurement reports or only partially based on measurement reports. Some examples of parameters that can be used to identify a potential for interference include a number of HARQ retransmissions, a number of Radio Link Failures and number of handover failures experienced by a LUE. When one or more of these numbers exceeds a respective threshold, the LSA base station determines that interference may be the cause. A particular interference evaluation may be based on a single parameter or a combination of parameters where the combination may include measurement reports in some circumstances.

At event 412, the LSA schedules the communication resources for the LUEs. In accordance with known techniques, the LSA base station schedules the communication resources for communication between the LUEs and the LSA base station. In some situations, a scheduler or controller connected to the LSA base station performs at least some of the scheduling functions.

At transmission 414, the uplink and downlink LSA resources are assigned to the LUEs. In accordance with the communication specification and known techniques, the LSA bases station transmits downlink control signals to the LUEs to schedule the LSA resources. If, however, the LUE is transferred to another base station with a handover, the LSA resources are not scheduled by the LSA base station.

At event 416, the SSA base station 210 identifies the SUEs that should read and forward the LSA scheduling information. For the example, the SSA base station 210 identifies, based on the measurement reports, one or more SUEs that are likely to successfully receive signals transmitted from the LSA base station. Other methods for identifying SUEs can be used in some circumstances. Since the SUEs typically only monitors control channels from the SSA base station (the serving base station) an SUE will only monitor the LSA scheduling information if it is selected by the SSA base station to read and forward the LSA scheduling information. Alternatively, a subset of all SUEs served by the SSA base station may be pre-selected to read and forward the LSA scheduling information, in which case it would not be necessary for the SUE 210 to provide the measurement report 408 and the SSA base station would not need to instruct the SUE 418 to read the scheduling information. For the example, if the scheduling information is transmitted over a new SIB, the SUE would only need to monitor the SIB change notification from the LSA base station. That way, if the LSA base station is not sending any updated or new scheduling information (e.g., LSA base station did not detect any interference) the SUE will not need to read the entire SIB.

Transmission 418 includes is an instruction to the identified SUEs to read the LSA scheduling information transmitted by the LSA base station. For the example, the instruction 418 is a one bit, Scheduling Information Indication message transmitted on a downlink control channel. The Scheduling Information Indication message is a dedicated signaling message to the SUE.

The LSA scheduling information 204 is transmitted at transmission 420 from the base station. Depending on the particular implementation, the LSA scheduling information may be transmitted in any data channel or control channel. As discussed below, examples of suitable techniques include broadcasting the LSA scheduling information in a System Information Block (SIB) and broadcasting the LSA scheduling information by MBSFN (Multimedia Broadcast multicast service Single Frequency Network) transmission. The LSA scheduling information is preferably transmitted within a time window before the LSA transmission that the scheduling information describes. If the LSA scheduling information is transmitted too early, conditions may change due to moving UEs. On the other hand, sufficient time should be provided for the RSUE 202 to relay the scheduling information to the SSA base station 210 and for the SSA base station to schedule resources using the information. For the examples herein, the scheduling information is transmitted in subframe n-x where x is greater than or equal to 4 and where the LUEs are scheduled in subframe n-4 for a transmission at subframe n. In some situations, the order of transmission 414 and transmission 420 may be reversed.

Although the measurement reports 406 indicate a likelihood of interference, the measurement reports 408 from the SUE may not provide an indication of interference. For example, if a SUE is relatively far from the SSA base station, but the LUE is very close to the SSA base station, the measurement reports 408 will not provide information regarding the potential for interference on the uplink at the SSA base station. The measurement reports 408, however, provide an indication of whether an SUE will be able to read the scheduling information transmitted from the LSA base station. In the examples herein, therefore, the SUE's that are instructed to read the LSA scheduling information, periodically and continuously read the LSA scheduling information. The LSA scheduling information identifies all communication resources of all LUEs that may experience or cause interference with a particular SSA base station. The LSA scheduling information also identifies the SSA base stations that may be impacted. For example, the LSA scheduling information may include Physical Cell IDs (PCIs). In some situations, the LSA scheduling information may also include Cell IDs where there is potential for confusion between PCIS of SSA base stations.

The RSUE transmits the LSA scheduling report transmission 422 to the SSA base station where the LSA scheduling report 422 provides information indicative of the LSA scheduling information broadcasted by the LSA base station. In some situations, the LSA scheduling report is the same as the LSA scheduling information. In other situations, it can be a derivation of the LSA scheduling information. For the examples, the LSA scheduling report transmission 422 is a transmission over the PUSCH.

At event 424, the SSA base station schedules SSA communication resources to one or more SUEs based on the LSA scheduling report. The SSA base station may refrain from assigning the resources identified in the LSA scheduling information or may prioritize the assignment based on the information. For example, SSA base station may assign the resources based on the distances of SUEs from the SSA base station. The SSA base station may evaluate other factors such as the QoS required by SUEs and interference from other SSA base stations.

Figure 5:
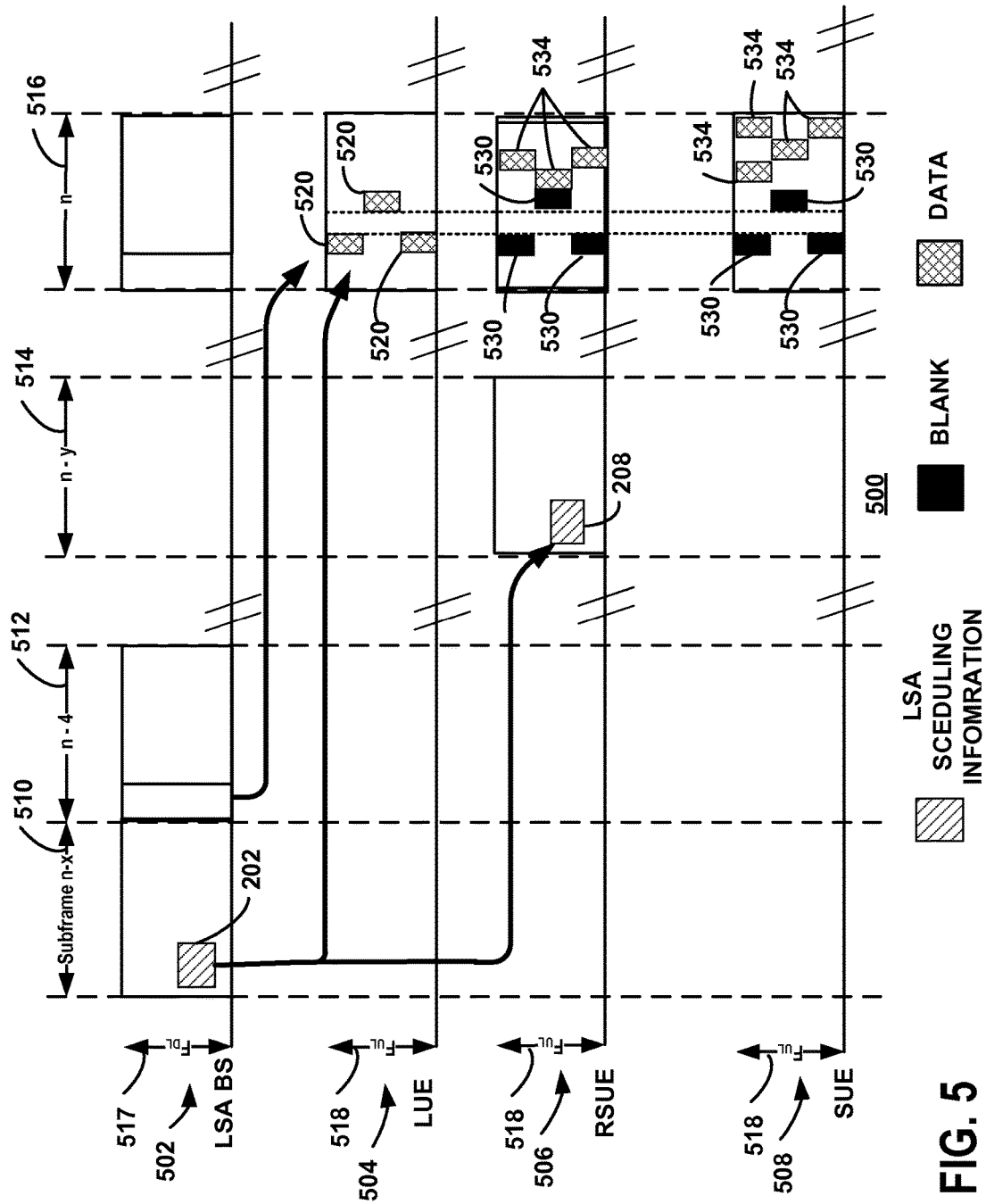
FIG. 5 is a transmission timing diagram of transmissions of the LSA base station, LUE, RSUE, and SUE where the LSA scheduling information is transmitted by the LSA base station.
Figure 6:
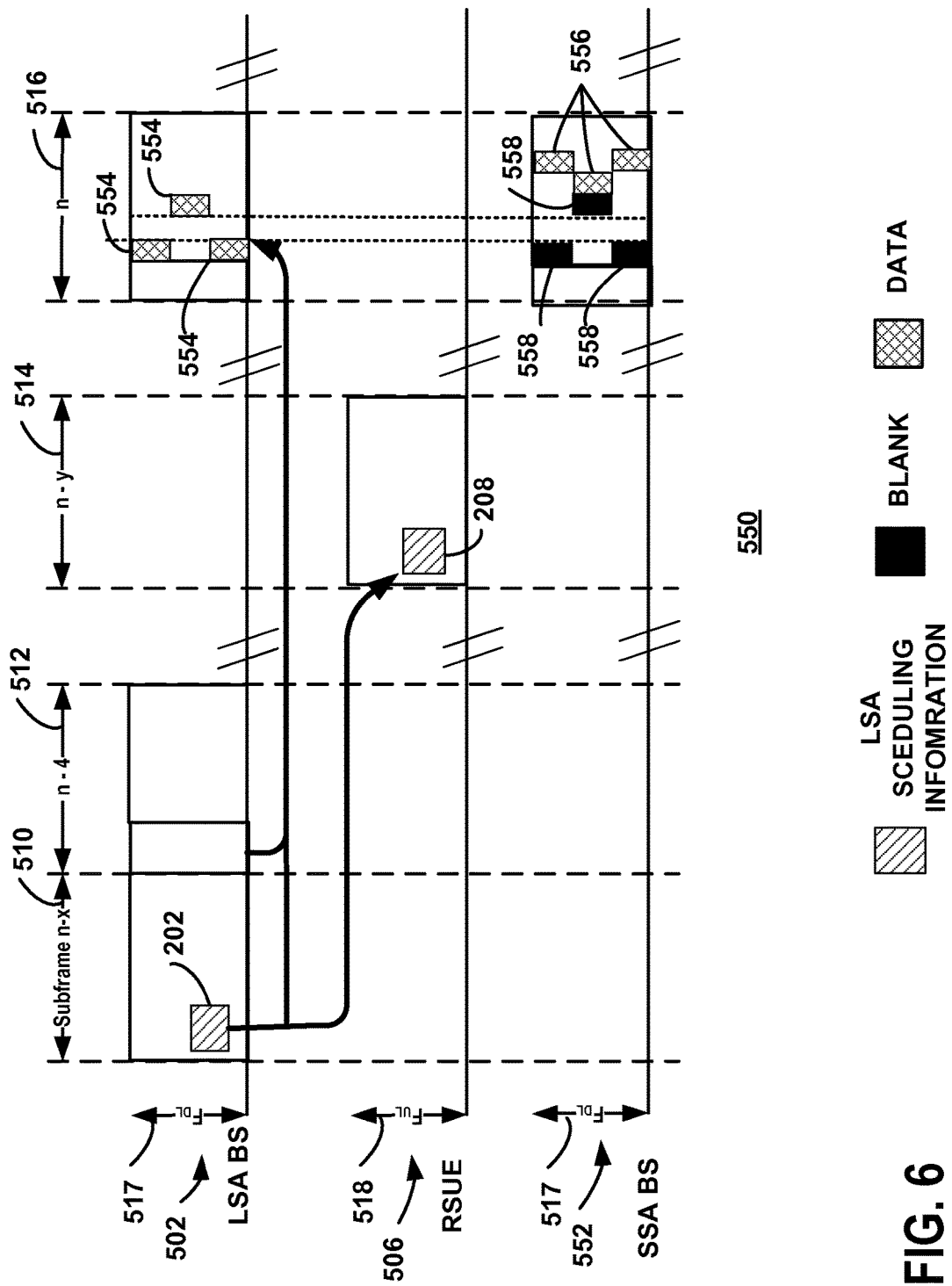
FIG. 6 is a transmission timing diagram of transmissions of the LSA base station, RSUE, and SSA base station where the LSA scheduling information is transmitted by the LSA base station.

FIG. 5 is a transmission diagram of transmissions 502, 504, 506, 508 of the LSA base station, LUE, RSUE, and SUE where the LSA scheduling information 202 is transmitted. The LSA base station transmission 502 includes a plurality of subframes 510, 512, 514, 516 transmitted in accordance with the communication specification within the downlink frequency band 517. The LSA base station transmission 502 is similar to conventional transmissions in LTE systems except for the differences discussed herein. The LSA scheduling information 202 identifies at least one of the uplink resources that will be used for uplink transmission by the LUE and the downlink resources that will be used by the LSA base station for downlink transmission. For the examples discussed herein, the LSA scheduling information identifies both the uplink and downlink resources as well as information (PCI) identifying the SSA base station. In the interest of clarity, FIG. 5 is directed to the uplink resources and FIG. 6 is directed to the downlink resources.

In accordance with known techniques, the LSA base station schedules uplink communication resources 520 to the LUE within a subframe prior to the uplink transmission. For the example, if the scheduled uplink transmission is in subframe n 516, subframe n-4 512 transmitted by the LSA base station contains the scheduling information for the LUE. Subframe n-4 512, therefore, identifies the time-frequency resources (blocks) 520 within the uplink frequency spectrum 518 that will be used by the LUE for uplink transmission at subframe n 516. At subframe n-x 510, the LSA base station broadcasts the LSA scheduling information. As discussed above, two examples of techniques of transmitting the LSA scheduling information include transmitting the information in a System Information Block (SIB) and transmitting the information in an MBSFN subframe. Where a SIB is used, the information may be transmitted in the PDSCH.

The relaying SUE (RSUE) receives the LSA scheduling information 204 and transmits resource information 208 that is indicative of the LSA scheduling information. In some circumstances, the information 208 is the LSA scheduling information 204 transmitted by the LSA base station. In other circumstances, it may be some other control data that allows the SSA base station to determine the LSA scheduling information. For the example, the information is transmitted by the RSUE in PUSCH of a subframe n-y 514 that is after the subframe n-4 512 and before subframe n 516.

Accordingly, for the example, y is between 3 and 1. A suitable subframe for transmission of the resource information 208 is subframe n-3. The SSA base station receives the resource information 208 and schedules the SUEs such that, at minimum, the communication resources indicated by the LSA scheduling information have low priority for assignment. In other words, the communication resources used by the LSA network are assigned last. For the example of FIG. 5, the uplink communication resources indicated by the LSA scheduling information are not assigned to the SUEs. Accordingly, the time-frequency blocks 530 are shown as blank boxes in the transmissions 506, 508 of the SUEs and the time-frequency blocks 520 are shown with cross hatching to indicate they contain data. Time frequency blocks 534 are scheduled for the RSUE transmission 506 and the SUE transmission 508 where the two SUEs use different communication resources.

FIG. 6 is a transmission diagram 550 of transmissions 502, 506, 552 of the LSA base station, RSUE, and SSA base station where the LSA scheduling information 202 is transmitted. For FIG. 6, the LSA scheduling information 202 identifies the downlink communication resources 554 that will be used by the LSA base station in subframe n 516. As discussed with reference to FIG. 5, the LSA scheduling information 202 is transmitted by the LSA base station 206 in subframe n-x 510. The RSUE transmits corresponding resource information 208 (or the LSA scheduling information 202) to the SSA base station in a subsequent subframe 514. The SSA base station schedules the downlink communication resources 556 to the SUEs such that the time-frequency blocks 558 corresponding to the downlink resources 554 used by the LSA base station are not used.

Figure 7:
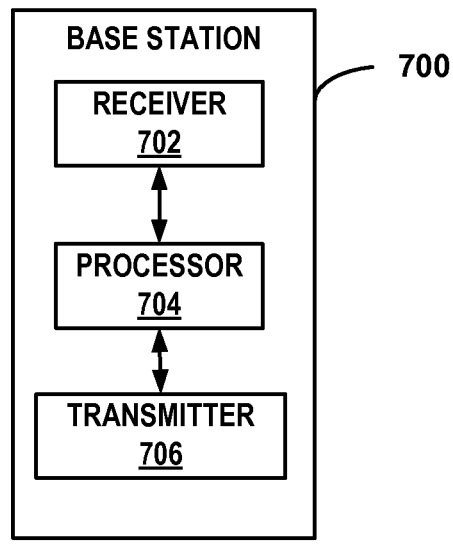
FIG. 7 is a block diagram of a base station including a receiver, a processor, and a transmitter suitable for use as the LSA base station and SSA base station.

FIG. 7 is a block diagram of a base station 700 including a receiver 702, a processor 704 and a transmitter 706. The base station 700 is suitable for use as the LSA base station 206 and SSA base station 210. For the examples herein, the base stations operate in accordance with a 3GPP LTE communication specification using Orthogonal Frequency Division Multiplexing (OFDM) modulation. Communication resources include a plurality of subcarriers that are divided in time. Accordingly, the receiver 702 receives uplink signals with information allocated in time-frequency blocks. Similarly, the transmitter 706 transmits downlink signals with information allocated in time-frequency blocks. As discussed above, interference may occur under some circumstances when the same time-frequency block is used by multiple devices.

The processor 704 controls the transmitter 704 and receiver 702 and facilitates the functions of the base station 700. For the examples, the processor 704 also performs scheduling of communication resources. The scheduling functions, however, may be performed by entities such as base station controllers, network controllers and separate schedulers. As discussed herein, the processor 704 may be implemented over several devices or components.

Figure 8:
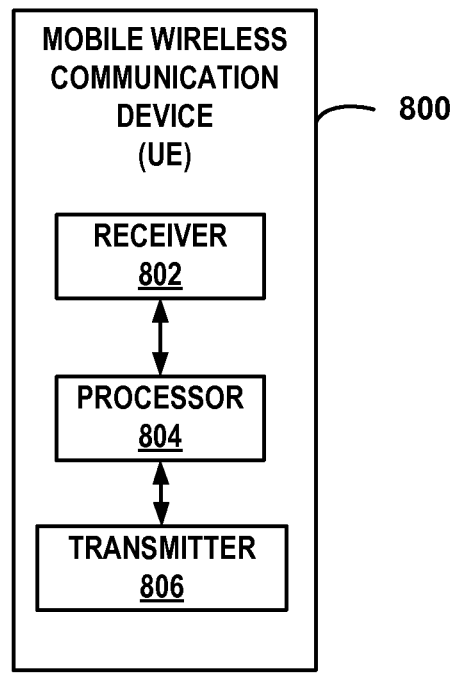
FIG. 8 is a block diagram of a mobile wireless communication device including a receiver, a processor and a transmitter suitable for use as the LUE and the SUEs.

FIG. 8 is a block diagram of a mobile wireless communication device 800 including a receiver 802, a processor 804 and a transmitter 806. The mobile wireless communication device 800 is suitable for use as the LUE 214 and the SUEs 202, 212. For the examples herein, the UEs operate in accordance with a 3GPP LTE communication specification using OFDM modulation. Communication resources include a plurality of subcarriers that are divided in time. Accordingly, the receiver 802 receives downlink signals with information allocated in time-frequency blocks. Similarly, the transmitter 706 transmits uplink signals with information allocated in time-frequency blocks. The processor 804 performs the various functions of the UEs discussed herein as well as facilitating the overall functionality and operation of the UE.

Figure 9:
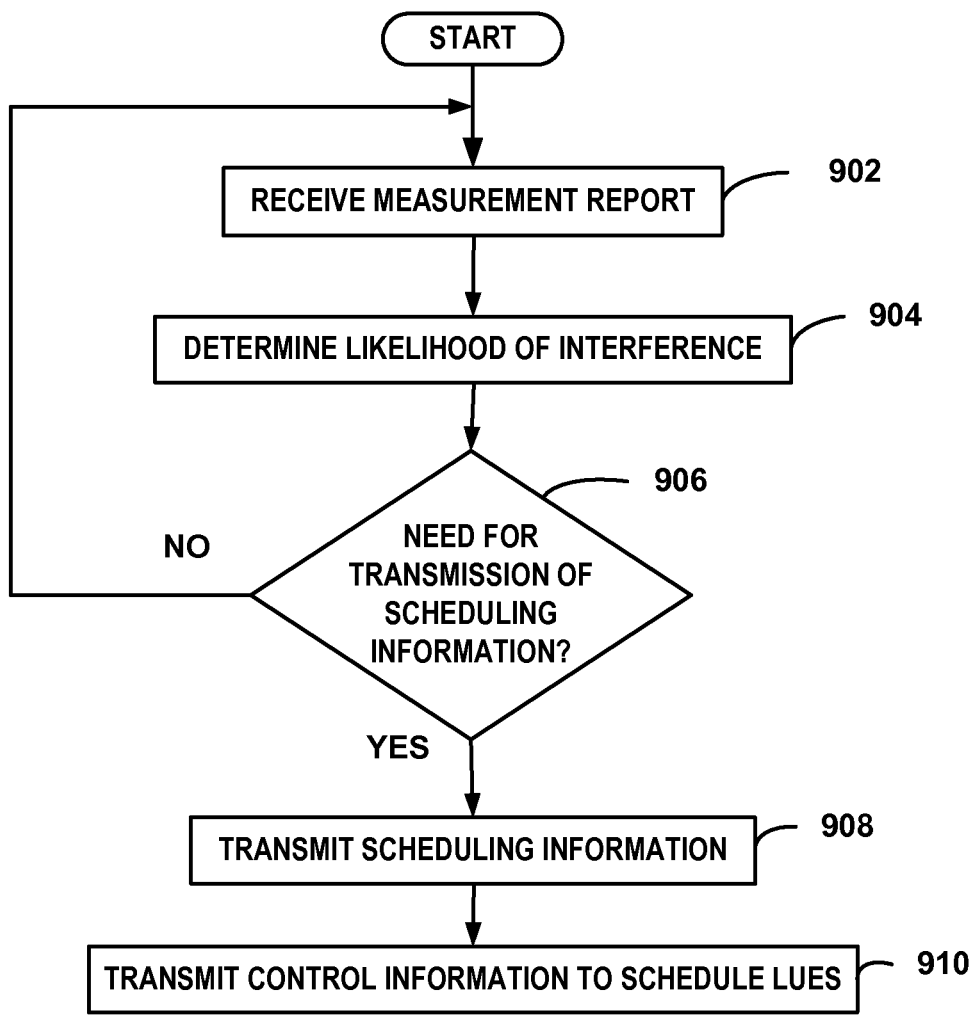
FIG. 9 is a flow chart of method in the LSA network of managing communication resources.

FIG. 9 is a flow chart of method in the LSA network of managing communication resources. For the example, the method is performed in the LSA base station although some of the functions may be performed by other entities connected to the LSA bases station. The steps of the flow chart may be performed in a different order than described herein and some steps may be performed simultaneously in some situations.

At step 902, the measurement reports from the LUEs are received. In accordance with known techniques, each LUE measures the RSRP and/or RSPQ of neighboring cells which includes measuring the reference signals of the SSA base station. A control signal transmitted from each LUE reporting the measurements is received by the LSA base station.

At step 904, the likelihood of interference is determined. For the example of FIG. 9, the LSA base station evaluates the measurements reports and determines whether any measurements exceed a threshold indicating the potential for interference. For example, if a reported power measurement indicates a sufficiently high power signal is being received by a LUE, the LSA base station determines that transmissions from the LUE could interfere with uplink transmissions from SUEs transmitted in to the SSA base station. A high power measurement indicates that the LUE is near the SSA base station and therefore, also indicate that downlink signals from the SSA base station could cause interference at the LUE. As discussed above, other parameters may be used to determine the potential for interference.

At step 906, it is determined whether the LSA scheduling information should be transmitted. If it is determined that interference is likely if the same communication resources are used by the SSA base station and the LSA base station, it is determined that the LSA scheduling information should be transmitted and the method continues at step 908. Otherwise, the method returns to step 902.

At step 908, the LSA scheduling information is transmitted. As discussed above, two examples of suitable techniques for transmitting the LSA scheduling information include transmitting the information in the SIB and a MBSFN subframe.

At step 910, the LUEs are scheduled by transmitting the control information to the LUEs. In accordance with known techniques, the communication resources for uplink and downlink communication are identified in the PDCCH.

Figure 10:
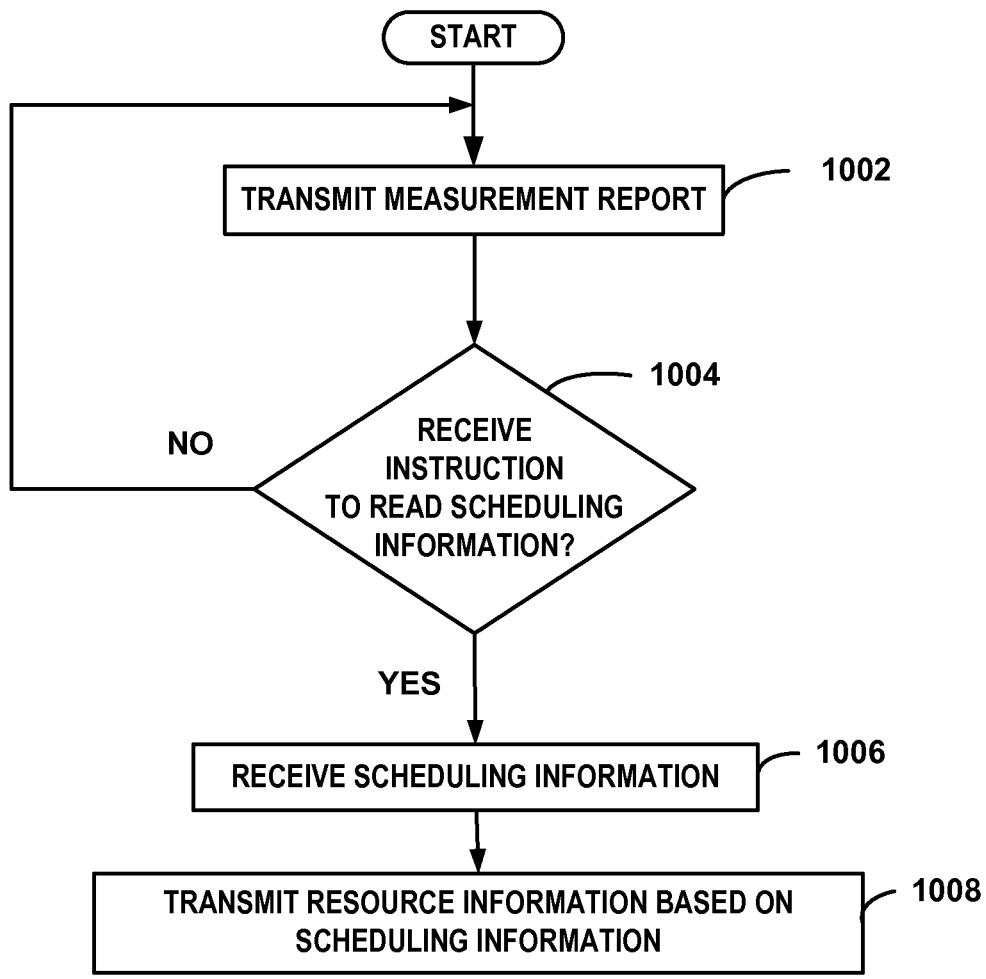
FIG. 10 is a flow chart of a method performed at a relaying wireless communication device (RSUE).

FIG. 10 is a flow chart of a method performed at a relaying wireless communication device. Accordingly, the method is performed in the RSUE for the example of FIG. 10. The steps of the flow chart may be performed in a different order than described herein and some steps may be performed simultaneously in some situations.

At step 1002, the measurement report is transmitted to the SSA base station. In accordance with known techniques, the RSUE measures the reference signals of neighboring base stations including the LSA base station and reports the results in a measurement report.

At step 1004, it is determined whether an instruction to read the scheduling information has been received. The UE monitors the control channels and determines if the SSA base station has sent an instruction. If the instruction has not been received, the method returns to step 1002. Otherwise, the method continues at step 1006.

At step 1006, the LSA scheduling information is received. The RSUE demodulates and decodes the appropriate signals transmitted by the LSA base station to determine the LSA scheduling information. In one example, the location of the scheduling information is set semi-statically and the RSUE is informed of the location. An example of suitable technique of information the RSUE where to find scheduling information includes sending information in an SIB. This technique may be used in both the implementation where the scheduling information is sent in the SIB and the implementation where the scheduling information is sent in an MBSFN subframe. For the examples herein, an SIB is dedicated for the base station to transmit the scheduling information so the SUE will know which SIB to read. Furthermore, the SUE will not need to continue to read the same SIB unless there's an updated based on the SIB change notification. So the SUE may just monitor signaling to determine whether a SIB change notification has been sent.

At step 1008, the LSA resource information is transmitted to the SSA base station. The LSA resource information is at least partially based on the LSA scheduling information transmitted by the LSA base station. In some circumstances, the LSA resource information is the same as the LSA scheduling information.

Figure 11:
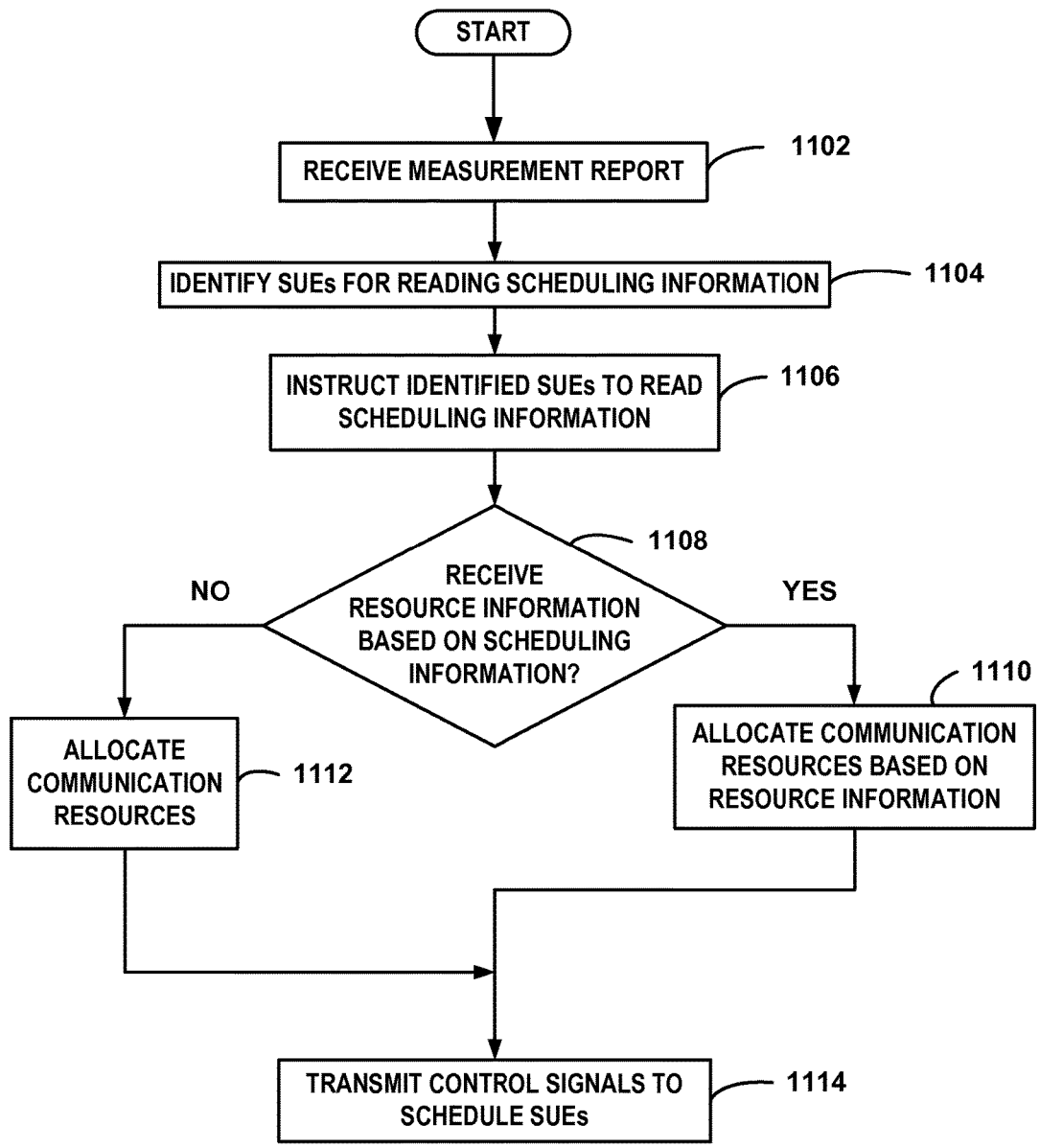
FIG. 11 is a flow chart of a method in the SSA network of managing communication resources.

FIG. 11 is a flow chart of method in the SSA network of managing communication resources. For the example, the method is performed in the SSA base station although some of the functions may be performed by other entities connected to the SSA base station. The steps of the flow chart may be performed in a different order than described herein and some steps may be performed simultaneously in some situations.

At step 1102, the measurement reports are received from the SUEs. In accordance with known techniques, each SUE measures the RSRP and/or RSPQ of neighboring cells which includes measuring the reference signals of the LSA base station. A control signal transmitted from each SUE reporting the measurements is received by the SSA base station.

At step 1104, SUEs are identified for reading the LSA scheduling information. Based on the measurement reports, the SSA base station identifies one or more SUEs for reading the LSA scheduling information. If the measurement report indicates that the SUE is receiving the LSA base station reference signal at a sufficiently high power level, the SSA base station determines that the SUE is able to read the LSA scheduling information. As a result, at least one of the SUEs reporting a sufficiently high LSA signal power level is identified as a SUE that will read the scheduling information.

At step 1106, the SSA base station sends an instruction to the identified SUEs instructing each SUE to read the LSA scheduling information. As discussed above, one technique for sending the instruction includes using a dedicated signaling message (Scheduling Information Indication message).

At step 1108, it is determined whether LSA resource information has been received. As discussed above, the LSA resource information is at least partially based on the LSA scheduling formation and, in some circumstances, may be the LSA scheduling information. If LSA resource information has been received, the method continues at step 1110. Otherwise, the method continues at step 1112.

At step 1110, the communication resources for SSA communication are allocated based on the LSA resource information. The SSA base station, takes into account the resources that are being used by the LSA base station when assigning communication resources to the SUEs. As discussed above, the communication resources used by the LSA base station may be avoided by the SSA base station or may be assigned to a SUE based on some criteria.

As step 1112, the communication resources are allocated in accordance with known techniques.

At step 114, the SSA base station transmits control signals to the SUEs to schedule communication resources. In accordance with known techniques, the downlink and uplink communication resources allocated at step 1110 or step 1112 are identified in control signals sent to the SUEs.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A system comprising:
a small service area (SSA) base station having a SSA geographical service area and configured to exchange communication data with SSA user equipment devices (SUEs); and
a large service area (LSA) base station having a LSA geographical service area at least partially overlapping the SSA geographical service area and configured to exchange communication data with LSA user equipment devices (LUEs), the LSA base station configured to transmit, to a relaying SUE (RSUE) of the SUEs, LSA scheduling information indicating communication resources that will be used for communication by the LSA base station,
the SSA base station configured to receive resource information indicative of the LSA scheduling information from the RSUE and to schedule communication resources to the SUEs based on the resource information.

2. The system of claim 1, wherein the communication resources comprise a plurality of frequency subcarriers divided in time to form time-frequency blocks.

3. The system of claim 2, wherein the SSA base station is configured to refrain from scheduling the time-frequency blocks indicated in the LSA scheduling information to the SUEs.

4. The system of claim 2, wherein the SSA base station is configured to schedule the time-frequency blocks indicated in the LSA scheduling information when scheduling communication resources for the SUEs for transmission identified as able to tolerate interference.

5. The system of claim 4, wherein a lower quality of service (QoS) SUE requires a lower QoS than another SUE and the SSA base station is configured to schedule the time-frequency blocks indicated in the LSA scheduling information to the at lower QoS SUE.

6. The system of claim 4, wherein a proximate SUE is closer to the SSA base station than another SUE and the SSA base station is configured to schedule the time-frequency blocks indicated in the LSA scheduling information to the proximate SUE.

7. The system of claim 1, wherein the communication resources are at least one of downlink communication resources and uplink communication resources.

8. The system of claim 1, wherein LSA bases station and the SSA base station transmit and receive signals in accordance with a 3GPP LTE communication specification.

9. The system of claim 8, wherein the LSA base station is configured to transmit the LSA scheduling information in a system information block (SIB).

10. The system of claim 8, wherein the LSA base station is configured to transmit the LSA scheduling information in a multicast-broadcast single-frequency network (MBSFN) subframe.

11. The system of claim 1, wherein the resource information is the LSA scheduling information.

12. The system of claim 1, wherein the LSA base station is further configured to:
determine a potential for interference at one or more LUEs due to SSA downlink signals transmitted from the SSA base station;
determine a potential for interference at the SSA base station from uplink signals transmitted from one or more LUEs; and
transmit the LSA scheduling information only when it is determined there is potential for information either at the one or more LUEs or the SSA base station.

13. The system of claim 12 wherein the LSA base station is configured to determine the potential for interference at one or more LUEs and the potential for interference at the SSA base station based on measurement reports provided by the LUEs.

14. The system of claim 12 wherein the LSA base station is configured to determine the potential for interference at one or more LUEs and the potential for interference at the SSA base station based on at least one of a number of HARQ retransmissions, a number of Radio Link Failures, and a number of filed handovers.

15. A small service area (SSA) base station providing wireless service to SSA user equipment devices (SUEs) within a SSA that is within a large service area (LSA) of a LSA base station providing wireless service within the LSA, the SSA base station comprising:
a receiver configured to receive LSA resource information identifying communication resources that will be used by the LSA base station;
a processor configured to allocate communication resources to the SUEs based on the LSA resource information.

16. The SSA base station of claim 15, wherein the LSA resource information is based on LSA scheduling information transmitted by the LSA base station.

17. The SSA base station of claim 15, wherein the communication resources comprise a plurality of frequency subcarriers divided in time to form time-frequency blocks.

18. The SSA base station of claim 17, wherein the processor is configured to refrain from scheduling the time-frequency blocks indicated in the LSA scheduling information to the SUEs.

19. The SSA base station of claim 17, wherein the processor is configured to apply a lower priority to the time-frequency blocks indicated in the LSA scheduling information when scheduling communication resources for the SUEs.

20. The SSA base station of claim 19, wherein a lower quality of service (QoS) SUE requires a lower QoS than another SUE and the SSA base station is configured to schedule the time-frequency blocks indicated in the LSA scheduling information to the at lower QoS SUE.

21. The SSA base station of claim 19, wherein a proximate SUE is closer to the SSA base station than another SUE and the SSA base station is configured to schedule the time-frequency blocks indicated in the LSA scheduling information to the proximate SUE.

22. The SSA base station of claim 15, wherein the communication resources are at least one of downlink communication resources and uplink communication resources.

23. The SSA base station of claim 15, wherein the LSA base station and the SSA base station transmit and receive signals in accordance with a 3GPP LTE communication specification.

24. The SSA base station of claim 15, wherein the LSA resource information is the LSA scheduling information.

25. A mobile wireless communication device comprising:
- a receiver configured to receive, from a large service area (LSA) base station, LSA scheduling information identifying wireless communication resources that will be used by the LSA base station; and
- a transmitter configured to transmit, to a small service area (SSA) base station, LSA resource information based on the LSA scheduling information, the SSA base station providing wireless communication service within a SSA service area that at least partially overlaps and is smaller than a LSA service area of the LSA base station.

26. The mobile wireless communication device of claim 25, wherein the LSA scheduling information is received within a system information block (SIB).

27. The mobile wireless communication device of claim 25, wherein the LSA scheduling information is received within a multicast-broadcast single-frequency network (MBSFN) subframe.

* * * * *